Patented May 28, 1940

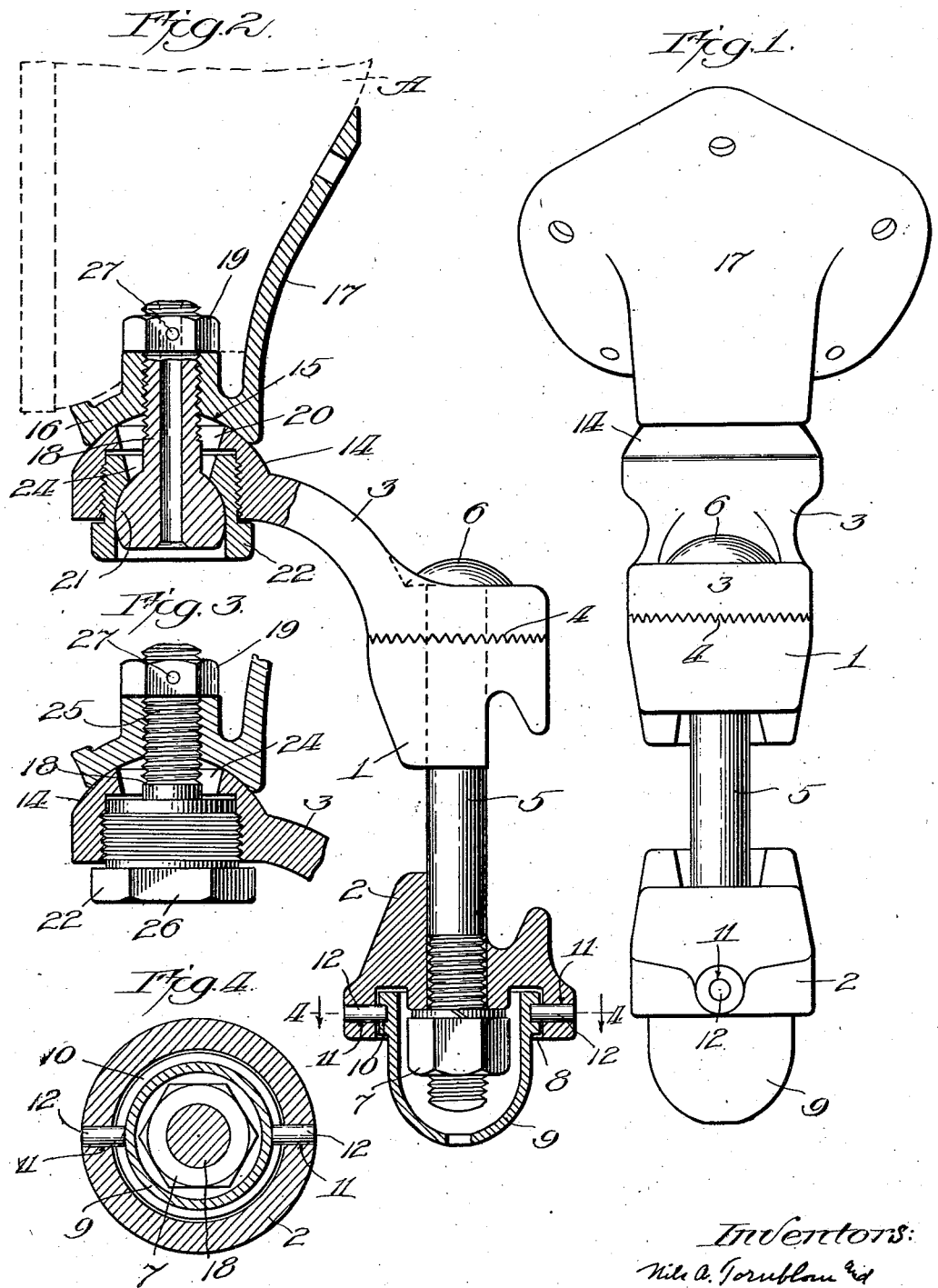

2,202,472

UNITED STATES PATENT OFFICE 2,202,472

THEFTPROOF ROADLIGHT MOUNTING

Nils A. Tornblom, Chicago, and Irwin Meyer, Cicero, Ill., assignors to Appleton Electric Company, a corporation of Illinois Application March 30, 1939, Serial No. 264,912

6 Claims. (Cl. 248—203)

It is common practice to mount lamps on the front bumpers of automobiles for road illumination purposes. As the fittings for holding such lamps in place are now constructed, it is a comparatively easy matter for unauthorized persons to detach the lamps and take them away.

The object of the present invention is to produce a simple and novel construction for mounting a lamp on an automobile bumper or other part upon which it may be desired to clamp a lamp support, which will make it very difficult to detach a lamp and thus make it reasonably certain that lamps of this type will not be stolen.

The various features of novelty whereby our invention is characterized will hereinafter be pointed out with particularity in the claims; but, for a full understanding of our invention and of its objects and advantages, reference may be had to the following detailed description taken in connection with the accompanying drawing, wherein:

Figure 1 is a rear elevation of one of the improved mountings for a lamp, including the saddle member of the lamp proper; Fig. 2 is a view, partly in side elevation and partly in section, of the structure shown in Fig. 1, a fragment of the lamp housing being shown in dotted lines; Fig. 3 is a sectional view of that portion of the fixture on which the lamp base rests, on the same plane as that in which the section is taken in Fig. 2, with the bolt and the sleeve nut shown in elevation instead of in section; and Fig. 4 is a section taken on line 4—4 of Fig. 2.

Referring to the drawing, 1 and 2 represent clamping jaws adapted to be placed respectively on top of and underneath a bar member of an automobile bumper and to be secured together so as to clamp the bar between them. Resting upon the member 1 is one end of an arm 3 for supporting a lamp. The members 1 and 3 preferably have circular faces in engagement with each other, these faces being serrated, as indicated at 4, in order to permit the arm to be adjusted into various angular positions upon the clamping member. A single bolt 5 serves to connect together the members 1, 2 and 3; this bolt passing down through the members 1 and 3 at the center of the circular contact faces between these two members, and having on its upper end a head 6 that rests on top of the arm. On the lower end of the bolt, below the member 2, is a nut 7. After the device has been applied to a bumper bar or other similar member, it remains fixed to the latter as long as the nut is tight. In order to detach the fixture, the nut need only be unscrewed. One of the features of our invention has to do with guarding against unauthorized unscrewing of this nut. To this end a recess 8 that is fairly deep and of a diameter considerably greater than the longest transverse dimension of the nut 7 is provided in the under side of the clamping jaw 2, this recess being coaxial with the bolt hole. A sturdy, cup-shaped cap 9 large enough in diameter to receive the nut 7 and deep enough so that it will stand clear of both the nut in the lower end of the bolt, has its open end inserted in the recess 8, after the nut has been tightened. This cap has a peripheral annular groove 10 close enough to the rim of the cup so as to lie wholly in the recess when the cap is in place. Any desired number of holes 11 are drilled radially of the axis of the recess through the annular wall bounding the recess; the diameter of these holes being approximately the same as the width of the groove 10. After the fixture has been fastened to the bumper and the cap has been inserted in the recess 8, pins 12 are driven into the holes 11; these pins being sufficiently short so that they will not project beyond the outer faces of the clamping member when they are fully entered in the annular groove in the cap. Consequently, after these pins have been driven in, they cannot be removed except by a workman provided with a drill with which to destroy them by drilling. Obviously, no ordinary sneak thief could remove these pins and thus gain access to the nut 7 to unscrew the same.

It is not sufficient merely to make the fixture theft-proof, but it should also be impossible to detach the lamp from the fixture without damaging the lamp, at least to the extent of making it necessary to break the lens. Another feature of our invention has to do with a connection between the lamp and the arm 3, which shall meet these requirements. In the arrangement shown, the free end of the arm 3 has a hemispherical part 14 on the upper side, this part fitting into a socket 15 in the under side of a base member 16 forming part of a saddle 17 which serves to support the lamp casing indicated at A. A bolt 18 is screwed up through the base member 16 at the center of the socket and may be locked against rotation by means of a jam nut 19 on the upper end. The free end of the arm 3 is substantially an inverted cup of which the spherical part 14 forms the bottom. A large hole 20 is formed in the center of the bottom wall of this cup to permit the saddle to rock in any direction. The lower end of the bolt 18 is in the form of a ball which may be flattened in that area that forms the end face of the bolt. Surrounding the ball 21 is a sleeve nut 22 which has a bore that is cylindrical for some distance inwardly from one end and then becomes semi-spherical; a hole 24 being cut to the other end of the nut from the bottom of the spherical seat in the nut, for the passage of the stem portion of the bolt. The hole 24 is somewhat larger in diameter than the body portion of the bolt and, with the hole 20, may form a chamber or bore in the form of an inverted frustum of a cone.

It will be seen that the sleeve nut must be placed on the bolt before the bolt is screwed into the lamp base, since the sleeve nut cannot be removed from the headed end of the bolt. It will also be seen, as best shown in Fig. 3, that whereas the screw threads 25 on the bolt are righthand threads, the threads 26 on the sleeve nut are lefthand. Obviously, in assembling the parts, the bolt must be slipped up through the sleeve nut after the latter has been screwed into the supporting arm, and be screwed into and through the lamp base by means of a suitable tool.

The parts may initially be assembled in such a manner that the lamp cannot thereafter be shifted on its supporting arm or bracket; or, if the sleeve nut is not initially screwed in as far as it will go, the connection may at any time be loosened sufficiently to permit the lamp to be adjusted angularly at any time. However, after an assembly has once been made, the lamp cannot be detached by a mere unscrewing operation. Thus, even if the friction between the sleeve nut and the ball-like head of the bolt were sufficient to cause a turning of the bolt in the event that a wrench could be applied to the sleeve nut, the bolt would not unscrew but would be caused to turn in a direction to screw it more tightly into the lamp base. Consequently, any effort tending to unscrew the sleeve nut, simply draws it against the head of the bolt and, if anything, tends to screw the bolt in more tightly; thus making it impossible for the lamp to be detached by an ordinary sneak thief. Even should it be possible to open the lamp casing so as to gain access to the nut 19, removal of this nut can be prevented by securing the nut to the bolt with a pin 27 driven in as are the pins 12. The fact that the bolt cannot be unscrewed by unscrewing the sleeve nut makes it possible to tighten the connection between the lamp and the supporting arm by simply applying to the sleeve nut a force in the direction tending to unscrew the same, since that serves to draw the sleeve nut tightly against the head of the bolt and afterwards to turn the bolt in a direction to make the fit still tighter.

While we have illustrated and described with particularity only a single preferred form of our invention, we do not desire to be limited to the exact structural details thus illustrated and described; but intend to cover all forms and arrangements which come within the definitions of our invention constituting the appended claims.

We claim:

1. In combination, two members having complementary surfaces in the form of sections of a sphere in engagement with each other, one of said members having a bore of large diameter extending into the same from the side opposite said surfaces, a sleeve nut screwed into said bore, a bolt extending radially of the aforesaid surfaces through the interior of said nut and screwed at one end into the second of said members, said bolt having a head at the other end, and said nut having a portion of the bore therethrough in the form of a socket fitting the under side of the bolt head, the threads on the bolt and on the nut being oppositely handed.

2. In combination, two members having complementary surfaces in the form of sections of a sphere in engagement with each other, one of said members having a bore of large diameter extending into the same from the side opposite said surfaces, a sleeve nut screwed into said bore, a bolt extending radially of the aforesaid surfaces through the interior of said nut and screwed at one end into the second of said members, said bolt having a ball-shaped head at the other end, and said nut having a portion of the bore therethrough in the form of a socket fitting the under side of the bolt head, the threads on the bolt and on the nut being oppositely handed.

3. In combination, two members having complementary surfaces in the form of sections of a sphere in engagement with each other, one of said members having a bore of large diameter extending into the same from the side opposite said surfaces, a sleeve nut screwed into said bore, a bolt extending radially of the aforesaid surfaces through the interior of said nut and screwed at one end into the second of said members, said bolt having a ball-shaped head at the other end, and said nut having a portion of the bore therethrough in the form of a socket fitting the under side of the bolt head, the threads on the bolt and on the nut being oppositely handed, that portion of the bore in the sleeve nut around the body of the bolt being larger than the bolt to permit the bolt and the member into which it is screwed to be shifted angularly upon the other member.

4. In combination, a lamp base member and an underlying supporting member having complementary surfaces in the form of sections of a sphere in engagement with each other, the supporting member having a bore of large diameter extending upwardly into the same from the under side toward said surfaces, a sleeve nut screwed into said bore, a bolt extending radially of the aforesaid surfaces through the interior of said nut and screwed at one end into the lamp base member, said bolt having a head at the lower end, and said nut having a portion of the bore therethrough in the form of a socket fitting the upwardly-facing side of the bolt head.

5. In combination, a lamp base member and an underlying supporting member having complementary surfaces in the form of sections of a sphere in engagement with each other, the supporting member having a bore of large diameter extending into the same from the under side, a sleeve nut screwed into said bore, a bolt extending radially of the aforesaid surfaces through the interior of said nut and screwed at one end into the lamp base member, said bolt having a ball-shaped head at the lower end, and said nut having a portion of the bore therethrough in the form of a socket fitting the upwardly-facing side of the bolt head, the threads on the bolt and on the nut being oppositely handed.

6. In combination, a lamp-base member and an underlying supporting member having complementary surfaces in the form of sections of a sphere in engagement with each other, the supporting member having a bore of large diameter extending into the same from the under side, a sleeve nut screwed into said bore, a bolt extending radially of the aforesaid surfaces through the interior of said nut and screwed at the upper end into the lamp base member, said bolt having a ball-shaped head at the lower end, said nut having a portion of the bore therethrough in the form of a socket fitting the upwardly-facing side of the bolt head, the threads on the bolt and on the nut being oppositely handed, and that portion of the bore in the sleeve nut around the body of the bolt being larger than the bolt to permit the bolt and the lamp base member to be shifted in unison angularly upon the other member.

NILS A. TORNBLOM.
IRWIN MEYER.